United States Patent [19]

Enanoza

[11] Patent Number: 4,851,278
[45] Date of Patent: Jul. 25, 1989

[54] ACRYLATE HOT MELT ADHESIVE CONTAINING ZINC CARBOXYLATE

[75] Inventor: Rudyard M. Enanoza, Woodbury, Minn.

[73] Assignee: Minnesota Mining and Manufacturing Company, St. Paul, Minn.

[21] Appl. No.: 163,218

[22] Filed: Feb. 25, 1988

Related U.S. Application Data

[63] Continuation of Ser. No. 895,323, Aug. 11, 1986, abandoned.

[51] Int. Cl.$^4$ ............................................. C08F 267/04
[52] U.S. Cl. ..................................... 428/195; 524/399; 525/285; 525/301; 525/330.2; 525/309
[58] Field of Search ................ 524/399, 783; 525/262, 525/285, 301; 428/195

[56] References Cited

U.S. PATENT DOCUMENTS

| | | |
|---|---|---|
| 3,492,265 | 1/1970 | Hefley et al. ........................ 524/399 |
| 3,740,366 | 6/1973 | Sanderson et al. ................. 524/399 |
| 3,925,282 | 12/1975 | Davis et al. . |
| 3,969,434 | 7/1976 | Powell et al. ........................ 524/399 |
| 4,045,517 | 8/1977 | Guerin et al. . |
| 4,337,325 | 6/1982 | Shah . |
| 4,354,008 | 10/1982 | Skoultchi . |
| 4,360,638 | 11/1982 | Bartman . |
| 4,370,380 | 1/1983 | Shah . |
| 4,403,058 | 9/1983 | Doh et al. ........................... 524/399 |
| 4,423,182 | 12/1983 | Bartman . |
| 4,456,741 | 6/1984 | Ames . |
| 4,551,388 | 11/1985 | Schlademan . |
| 4,554,324 | 11/1985 | Husman et al. . |

*Primary Examiner*—John C. Bleutge
*Assistant Examiner*—David W. Woodward
*Attorney, Agent, or Firm*—Donald M. Sell; Walter N. Kirn; Richard Francis

[57] ABSTRACT

An improved hot melt pressure sensitive adhesive composition comprises copolymerized monomeric acrylate or methacrylate ester of a non teritary alcohol, polar monomer such as acrylic acid, 2-polystyrylethyl methacrylate macromolecular monomer and sufficient zinc carboxylate to endow the composition with improved melt flow properties and cohesive strength. The invention also provides adhesive coated sheet materials comprising the adhesive composition coated onto a flexible sheet.

12 Claims, No Drawings

ACRYLATE HOT MELT ADHESIVE CONTAINING ZINC CARBOXYLATE

This is a continuation of application Ser. No. 895,323 filed Aug. 11, 1986, now abandoned.

DESCRIPTION

Technical Field

This application relates to normally tacky, hot melt pressure sensitive adhesive compositions comprising acrylate copolymer and sheet materials coated therewith.

Background Art

Normally tacky, pressure-sensitive adhesive compositions suitable, for example, for use in adhesive tapes must have a requisite four-fold balance of adhesion, cohesion, stretchiness and elasticity. Hot melt pressure-sensitive adhesive compositions are thermoplastic and largely amorphous adhesives, softening gradually from the solid state to an easy flowing liquid state over a wide range of temperature.

There are several reasons for using hot melt pressure-sensitive adhesives. Their use provides an energy savings because typically in use the only energy input that is required is that to raise the temperature of the composition to the liquid flowable state, thereby avoiding energy-intensive curing or drying steps. Furthermore, hot melt adhesives typically do not include solvents which often are flammable and/or toxic.

Early hot melt adhesive compositions were 100 percent solid blends of thermoplastic copolymers, e.g., rubber elastomers, tackifiers, waxes, etc., which were required to be of a lower molecular weight to achieve the appropriate melt viscosity. Such low molecular weight compositions, however, had limited oxidative and photochemical stability and marginal high-temperature cohesive strength. Acrylic-based hot melt pressure-sensitive adhesives have been introduced to improve these properties while maintaining the appropriate balance of adhesive and cohesive strength.

Various methods are available to improve the viscoelastic behavior of acrylate pressure-sensitive adhesives to make them suitable as hot melt pressure-sensitive adhesives. These include increasing their molecular weight, crosslinking, tackification, plasticization and/or chemical compounding. The molecular weight may be raised to improve shear strength, but this generally results in a composition with poor processability and a decrease in adhesive tack. Crosslinking, for example, by use of photochemical crosslinking methods requires expensive equipment and also results in reduced adhesive tack. The addition of tackifiers and/or plasticizers may improve the adhesive tack of the composition, but such additions typically reduce the cohesive strength and long term aging properties.

Chemical compounding involves changes in chemical composition by use of different kinds or amounts of monomer. In general, an acrylic hot melt pressure-sensitive adhesive comprises a copolymer of an acrylate or methacrylate ester of glass transition temperature ($T_g$) copolymerized with a polar monomer such as acrylic acid and a modifying monomer having a higher $T_g$. Acrylic acid or acrylamide have been known to increase the cohesive strength of an adhesive composition because of hydrogen bonding.

Guerin et al (U.S. Pat. No. 4,045,517) describe adhesive compositions which are improved by a polar interaction in the form of salt linkages between high $T_g$ polymer and a low $T_g$ polymer. Shah (U.S. Pat. No. 4,337,325 and U.S. Pat. No. 4,370,380) describe reinforcing domains by incorporating high $T_g$ blocks with low molecular weight acrylic adhesive chains via hydrogen bonding. Ames (U.S. Pat. No. 4,456,741) describes the use of N-vinyl-2-pyrrolidone and styrene to provide hot melt pressure-sensitive adhesives.

Additionally, Skoultchi (U.S. Pat. No. 4,354,008) describes hot melt pressure-sensitive adhesives from random acrylic copolymers containing chelatable comonomers and chelatable salts of transition metals. Davis et al (U.S. Pat. No. 3,925,282) describe thermally reversible hot melt adhesives comprising an acrylic copolymer containing a tertiary amine comonomer and an organometallic salt. Bartman (U.S. Pat. No. 4,360,638 and U.S. Pat. No. 4,423,182) describe a crosslinking method utilizing a thermally reversible ionomeric linkage between ortho-anisic acid and zinc ion for preparing acrylic hot melt pressure-sensitive adhesives with low melt viscosity. These ionomeric systems have been found by applicant, however, to lack the requisite four-fold balance of properties required for pressure-sensitive adhesive compositions.

Recent examples of acrylic hot melt pressure-sensitive adhesive compositions are described in Husman et al U.S. Pat. No. 4,554,324), assigned to the assignee of the present application, and Schlademan (U.S. Pat. No. 4,551,388). Each of these references describes acrylate pressure-sensitive adhesives prepared by copolymerizing vinyl aromatic macromolecular monomer with acrylic or methacrylic acid esters and possibly polar monomer such as acrylic acid. This approach is recognized as giving acrylate-styrene graft copolymers with improved flexibility and general versatility by combining the attractive features of the individual polymer components. A review of early hot melt compositions is also presented by D. Bateman in Hot Melt Adhesives, (Noyes Data Corp., 3rd Ed.) 1978.

DISCLOSURE OF THE INVENTION

The invention provides a normally tacky, hot melt pressure-sensitive adhesive composition and adhesive coated sheet materials coated therewith. The pressure-sensitive hot melt adhesive composition has the requisite four-fold balance of adhesion, cohesion, stretchiness and elasticity and it also has excellent processability.

The hot melt pressure-sensitive can be coated using conventional hot melt coating equipment to give a stable adhesive film or coating. The adhesive has a suitable balance of melt flow properties and cohesive strength which permits such adhesive films to be longitudinally and biaxially attenuated to provide much thinner continuous sheets, e.g., on the order of five micrometers in thickness. The adhesive composition also has good creep resistance and, for the most part, excellent clarity, and resistance to oxidative and photochemical degradation.

Specifically, the hot melt pressure-sensitive adhesive composition of the invention comprises copolymer consisting essentially of copolymerized monomers (a), (b), and (c), as follows:
  (a) about 82–92% by weight of a monomeric acrylic or methacrylic acid ester of a non-teritary alcohol, the alcohol having from 1 to 14 carbon atoms with the average number of carbon atoms being about 4-12;

(b) about 2-5% by weight polar monomer copolymerizable with monomeric acrylic or methacrylic acid ester; and (c) about 2-15% (preferably 2-8%) by weight of 2-polystyryl-ethyl methacrylate macromolecular monomer; and sufficient zinc carboxylate to endow the composition with improved melt flow properties and cohesive strength.

The preferred zinc carboxylate is selected from the group consisting of zinc acetate, zinc octoate, and zinc neodecanoate. The preferred amount of zinc carboxylate is from about 0.1 to about 5% by weight, based on the weight of the copolymer.

The preferred monomeric acrylic or methacrylic acid ester is selected from the group consisting of butyl acrylate, isooctyl acrylate, 2-ethylhexyl acrylate, and isononyl acrylate.

The preferred polar monomer is selected from the group consisting of acrylic acid, methacrylic acid, itaconic acid, maleic anhydride, maleic acid, citraconic anhydride, citraconic acid and mixtures thereof.

The present invention also provides sheet materials coated with the hot melt pressure-sensitive composition described above. The sheet materials in accordance with the present invention comprise a backing member and a coating of the pressure sensitive adhesive covering at least a portion of one major surface of the backing member.

DETAILED DESCRIPTION OF THE INVENTION

In accordance with this invention, a normally tacky and pressure-sensitive hot melt adhesive composition comprises a polymer having in its backbone repeating units from acrylic or methacrylic acid ester of a non-tertiary alcohol, polar monomer and 2-polystyrylethyl methacrylate macromolecular monomer. Such monomers are disclosed in aforementioned Husman et al U.S. Pat. No. 4,554,324 which patent is incorporated herein by reference for such disclosure.

The acrylic and methacrylic acid esters are low $T_g$ monomers of non-tertiary $C_1$ to $C_{14}$ alcohols, having a $T_g$ which is typically lower than 20° C. The most preferred acrylate esters of this type include butyl acrylate, isooctyl acrylate, 2-ethylhexyl acrylate or isononyl acrylate, but others are also useful.

A useful 1-polystyrylethyl methacrylate macromolecular monomer is commercially available under the registered trademark "Chemlink" 4500. Such monomers are high $T_g$ polymeric materials, having a $T_g$ on the order of 90° C. or higher, and a molecular weight typically on the order of 5,000 to 25,000.

Preferred polar monomers include acrylic acid, methacrylic acid, itaconic acid, maleic acid and its anhydride, and citraconic acid and its anhydride.

The zinc carboxylate is the $Zn^{+2}$ salt of a difunctional organic acid or anhydride. Preferred zinc carboxylates include zinc acetate, zinc octoate, and zinc neodecanoate. The preferred amount of zinc carboxylate is such that the molar ratio of polar monomer to zinc carboxylate is in the range of about 10:1 to about 130:1.

The preferred preparative method is to mix all components in an organic solvent, preferably in a mixture of ethyl acetate and methanol, in order to control the bulk viscosity to provide an easily mixed mixture, in the presence of a free radical initiator such as azo-type or peroxide initiator, preferably 2,2'-azobis(isobutyronitrile), and a chain transfer agent such as carbon tetrabromide or a mercaptan such as dodecyl mercaptan which are most preferably soluble in the same organic solvent. After suitable purging with an inert gas to expel moisture and oxygen, polymerization is initiated preferably at about 55°-60° C. and then the solvent removed using standard techniques. An alternative procedure is to prepare the terpolymer in solution and then add a solution of zinc carboxylate in a suitable solvent, e.g., an alcohol such as methanol. Still another procedure is to solvent-strip the terpolymer solution and then mechanically blend the zinc carboxylate into the solvent-free terpolymer, e.g., by extrusion, roll mixer or shear mixer.

The resultant polymeric product produced by the afore described procedure is an ionomer formed of acrylic terpolymers containing ionic crosslinks as a result of pendant carboxylate groups associated with the zinc cation. Since these ionomers are not covalently crosslinked, they are thermoplastic and processable in conventional equipment and show a high degree of chain interaction. These ionomers are heat-labile acrylic polymers with amorphous regions of great cohesive strength by virtue of the ionomeric network. The character of ionomeric network is thought to be controlled by the relative amount of polar monomer and zinc carboxylate, with an increasing network or more pronounced cohesive strength being provided with increasing amounts of zinc carboxylate.

By adjusting the inherent viscosity preferably to less than about 1.8 (0.15 g/ 100 ml in solvent such as ethyl acetate) and/or by adding plasticizers and tackifying agents, the acrylic ionomers can be readily processed using standard hot melt coating equipment such as extruders. Thermal and photochemical stabilizers may be added during extrusion, preferably before solvent removal.

The addition of zinc carboxylate to the adhesive results in improvement in shear-holding values and acceptable processing properties in terms of stable melt flow, even with severe draw-down or orientation.

The hot melt pressure sensitive adhesive compositions of the present invention preferably include a tackifying resin in an amount sufficient to endow the composition with improved adhesive tack but not so much as to interfere with its adhesive properties. Preferably, the amount of tackifier resin is on the order of 5 to 25 parts tackifier per 100 parts terpolymer zinc carboxylate composition. Preferred tackifiers are referred to as mixed aliphatic/aromatic hydrocarbon resins. Such resins are typically derived from the C-5 and C-9 feedstock of petroleum hydrocarbon distillation processes. Commercially available examples of these tackifiers are Exxon's Escorez TM 2101, Hercules' Hercotac TM AD-1100, Goodyear's Wingtack TM Plus Hercules' Florel TM 85 is a glycerine resin ester tackifier which is also a good combination tackifier and plasticizer when higher concentrations of the metal crosslinker are used.

Adhesive compositions are normally employed as 100 percent solids but, if needed, can also be applied in a suitable solvent such as ethyl acetate, methyl ketone, toluene, or mixtures thereof.

Additionally, while no additives are generally needed, certain additives may be employed for specific purposes, including for example, fillers, pigments, antioxidants, ultra-violet light inhibitors, plasticizers and other additives typically included in conventional pressure sensitive adhesive compositions.

The hot melt pressure sensitive adhesive compositions according to the present invention may be employed to seal boxes, adhere furniture parts, and for other purposes where conventional hot melt adhesives are employed. Such uses typically involve the application of a fillet or bead of the hot melt adhesive in the molten state to one or both parts to be adhered, joining the parts, and thereafter permitting the adhesive composition to cool to provide a firm adhesive bond. More often, the adhesive composition of the present invention is applied to a backing, such as a flexible backing formed of any of a variety of conventional backing materials such as paper, e.g., Kraft paper or crepe paper, plastic film, which may be primed to provide a more aggressive adhesive bond thereto, e.g., polyester films such as polyethylene terephthalate, polypropylene, polyethylene, etc., woven or nonwoven backing materials such as that used in packaging and fastening tapes.

The adhesive composition may be applied with conventional hot melt adhesive application equipment such as by use of extruders which extrude a sheet or fillet of molten adhesive or by merely heating a container of adhesive composition and removing a portion of the molten adhesive with a suitable device for application where needed. Such processing equipment is conventional and well known in the adhesive art.

Further modifications may be made in the adhesive composition described without departing from the scope of the claims.

EXAMPLES

The following examples are provided to further illustrate the claimed invention. All parts described in the examples are by weight, unless otherwise specified.

Examples 1-10 and Controls A-C

The preferred adhesive composition according to the invention, having the requisite four-fold balance of adhesion, cohesion, stretchiness, and elasticity is a terpolymer of isooctylacrylate (IOA), 2-polystyrylethyl methacrylate macro-molecular monomer (PSMA), and acrylic acid (AA) with the acrylic acid partially neutralized with zinc cation most preferably with a ratio of IOA:PSMA:AA of about 92-93:3-4:4. The adhesive properties of various adhesive compositions identified as Examples 1-10 are summarized in Table 1. Examples 1-10 had acceptable processing ability, (a broad melt viscosity profile) and a good elastic modulus. A description of the preparation of Examples 1-10 and Control A-C is given below.

Control A

General Procedure for IOA/PSMA/AA (93/3/4)

A three-liter reaction flask, equipped with condenser, nitrogen inlet, temperature control, heating means and stirrer was charged with 200 g. of methanol, 930 g. of isooctyl acrylate monomer (IOA), 40 g. of acrylic acid monomer (AA), 800 g. of ethyl acetate, 30 g. of 2-polystyylethyl methacrylate macromolecular monomer (PSMA) (available as CHEMLINK TM 4500 from Sartomer Chemical Co.), 0.60 g. of carbon tetrabromide and 2.12 g. of 2,2'-azobis(2-methyl-propionitrile). The reaction mixture was stirred to dissolve the PSMA and then deaerated by repeated applications of vacuum and nitrogen (three times) while being heated to 55° C. Tendency to exotherm was held below 64° C. by intermittent cooling in an ice-water bath. The reaction was continued for 24 hours at 55° C. with constant stirring. The reaction product was transferred to a aluminum tray which was placed in an oven to remove the solvent. Analysis revealed a number average (MN) molecular weight of $1.48 \times 10^5$, a polydispersity of 2.96, and an inherent viscosity run in ethyl acetate at a concentration of 0.15 g. per 100 ml. of 0.60.

Control B

Preparation of Acrylic Hot Melt PSA of Composition IOA/PSMA/AA (92/4/4)

The identical procedure of Control A was followed except for the charging of the two monomers (IOA and AA) and the macromolecular monomer (PSMA). These charges were 920 g. isooctyl acrylate (IOA), 40 g. acrylic acid (AA) and 40 g. of polystyrylethyl methacrylate (PSMA). The analytical results of this reaction product revealed a number average (MN) molecular weight of $1.53 \times 10^5$, a polydispersity of 2.85 and an inherent viscosity of 0.63.

Control C

Preparation of Acrylic Hot Melt PSA of Composition IOA/AA (96/4) with 1.00% Zinc Octoate A two-liter reaction flask equipped with condenser, nitrogen inlet, temperature control, heating means, and stirrer was charged with 100 g. of methanol, 384 g. of iso-octyl acrylate monomer (IOA), 16 g. of acrylic acid monomer (AA), 390 g. of ethyl acetate, 4 g. of zinc octoate, 0.24 g. of carbon tetrabromide and 0.84 g. of 2,2'azobis (2-methyl-propionitrile). The mixture was deaerated by repeated applications of vacuum and nitrogen (three times) then heated to 5° C. with stirring (250 RPM) and nitrogen purge. The exotherm was held below 64° C. by intermittent cooling in an ice-water bath. The reaction was continued for 24 hours at 55° C. with constant stirring. The resulting solution was transferred to a TEFLONTM TM-lined aluminum tray which was placed on an oven to remove the solvent. Analysis revealed a number average ($M_N$) molecular weight of $1.70 \times 10^5$, a polydispersity of 3.45, and an inherent viscosity run in ethyl acetate at a concentration of 0.15 g. per 100 ml. of 0.96.

EXAMPLES 1-10

Preparation of Ionomeric, Acrylic Hot Melt PSAs From IOA/PSMA/AA (93/3/4 and 92/4/4) With Varied Amounts of Zinc Carboxylates The general procedure described in Procedure A (Control A) was followed in the preparation of Examples 1 through 10 except for the addition of zinc carboxylate. The actual charge of zinc carboxylate is based upon a total weight of 1000 grams of monomers and the weight percentage of zinc carboxylate (e.g., acetate, octoate or decanoate) is reported in Table I.

TABLE I

| Ex. No. | Monomer & Ratio | Zn Carboxylate (Anion) | (wt. %) | I.V.[1] | C.T.[2] ($\mu$m) | 180° Peel (N/100 mm) | Shear (Min.) |
|---|---|---|---|---|---|---|---|
| 1. | IOA/PSMA/AA | Acetate | 1.22 | 0.94 | 23 | 57 | 282[3] |

TABLE I-continued

| Ex. No. | Monomer & Ratio | Zn Carboxylate (Anion) | (wt. %) | I.V.[1] | C.T.[2] (μm) | 180° Peel (N/100 mm) | Shear (Min.) |
|---|---|---|---|---|---|---|---|
| 2. | 93/3/4 " | Acetate | 1.00 | 0.85 | 25 | 59 | 320s |
| 3. | " | Octoate | 1.33 | 0.71 | 23 | 64 | 380 |
| 4. | " | Octoate | 1.00 | 0.70 | 23 | 75 | 133 |
| 5. | IOA/PSMA/AA 92/4/4 | Acetate | 1.22 | 0.77 | 23 | 51 | 402s |
| 6. | " | Acetate | 0.49 | 0.71 | 23 | 62 | 128s |
| 7. | " | Octoate | 1.33 | 0.70 | 23 | 62 | 484 |
| 8. | " | Octoate | 1.00 | 0.76 | 23 | 62 | 233 |
| 9. | " | Octoate | 0.67 | 0.74 | 25 | 70 | 138 |
| 10. | " | Decanoate | 2.84 | 0.53 | 23 | 57 | 372 |
| Control A | IOA/PSMA/AA 93/3/4 | None | None | 0.60 | 23 | 79 | 10s |
| Control B | IOA/PSMA/AA 92/4/4 | None | None | 0.63 | 23 | 79 | 29s |
| Control C | IOA/AA 96/4 | Octoate | 1.00 | 0.96 | 23 | 70 | 5s |

[1]"I.V." means inherent viscosity run at 30° C. in ethyl acetate at 0.15 g/100 ml.
[2]"C.T." means coating thickness in micrometers (μm)
[3]"s" means the adhesive split or it suffered cohesive failure.

As shown in Table I, increased shear-holding values were obtained when macromolecular monomer (PSMA) and zinc carboxylate were used together. Table I shows a similar increase in shear-holding value was observed in macromolecular monomer-containing adhesive formulations with low macro-molecular monomer content, e.g., IOA/PSMA/AA (93/3/4).

Examples 11-16 verify that the preferred addition of zinc carboxylate is by in situ, (batch) addition. Examples 11-16 consisted of IOA/PSMA/AA (92/4/4) with the amount and type of zinc carboxylate shown in Table II below.

EXAMPLES 11-16
TABLE II

Effect of Mode of Adding Zinc Carboxylates

| Ex. No. | Zn Carboxylate (anion) | (wt. %) | Type of Addition | CT (μm) | 180° Peel (N/100 mm) | Shear (min.) |
|---|---|---|---|---|---|---|
| 11 | Octoate | 1.00 | in situ | 24 | 62 | 233 |
| 12 | Octoate | 1.00 | post-polymn | 24 | 77 | 82s |
| 13 | Acetate | 1.22 | in situ | 24 | 51 | 402 |
| 14 | Acetate | 1.22 | post-polymn | 23 | 75 | 57s |
| 15 | Decanoate | 1.41 | in situ | 23 | 84 | 25s |
| 16 | Decanoate | 1.41 | post-polymn | 23 | 81 | 26s |

EXAMPLE 17
IOA/PSMA/AA/Zn Octoate (91/4/4/1)

A mixture of isooctyl acrylate (100 kg), acrylic acid (4.35 kg), macromolecular monomer having a molecular weight of 13,000 and being commercially available under the trademark "CHEMLINK" 4500, zinc octoate (1.1 kg), ethyl acetate (87 kg), methanol (22 kg), carbon tetrabromide (65.4 g.), and 2,2'-azobis(isobutyronitrile) free radical initiator available under the trade designation "VAZO" 64 from the E.I. DuPont Company (229 g.) was charged into a 285-liter reactor, purged by vacuum and nitrogen gas and then heated to 55° C. and kept at this temperature for 24 hours. Vacuum reflux and jacket cooling were used to control the exotherm. The solution polymer was then solvent-stripped and the hot melt collected in 20-liter pails. Gel permeation chromatography (GPC) analysis showed a number average molecular weight (Mn) of $2.77 \times 10^5$ and polydispersity of 2.59. Inherent viscosity at 30° C. (0.15 g/100 ml tetrahydrofuran [THF]) was 1.22. Adhesiveness testing of 20 micrometer extruded adhesive coating revealed a 180° peel strength of 48 N/100 mm and a shear strength of 1364 minutes.

EXAMPLE 18
IOA/PSMA/AA/Zn Acetate (92/3/4/1)

This was prepared as in Example 1 from isooctyl acrylate (100 kg), acrylic acid (4.8 kg), macromolecular monomer ("CHEMLINK" 4500) (324 kg), zinc acetate (1.1 kg), ethyl acetate (87 kg), methanol (21.7 kg), carbon tetrabromide (65.3 g.), and free radical initiator ("VAZO" 64) (228 g.). GPC analysis showed Mn of $2.58 \times 10^5$ and a polydispersity of 2.82. Inherent viscosity at 30° C. (0.15 g/100 ml THF) was 1.14. Adhesive testing revealed a 180° peel strength of 46 N/100 mm and a shear time of 379 minutes.

Test Methods

Gel Permeation Chromatography

The molecular weight distribution of the adhesive compositions was characterized by conventional gel permeation chromatography (GPC) using a Hewlett-Packard Model 1084B, high performance liquid chromatograph equipped with ultra STYRAGEL® columns and differential refractometer and UV detectors. All GPC calculations were performed on a Hewlett-Packard Model 3388 integrator and all molecular weight averages are polystyrene equivalent molecular weights. The molecular weight averages and polydispersities were calculated according to accepted practices. Percent incorporated molecular monomer was calculated using a UV detector.

Percent Incorporated Carboxylic Acid

The percent incorporated carboxylic acid was determined using conventional titration of the adhesive dissolved in tetrahydrofuran against a sodium hydroxide standard solution to the phenolphthalein end point.

Inherent Viscosity Measurements

The inherent viscosity (I.V.) was measured by conventional means using a Cannon-Fenske #50 viscometer in a water bath controlled at 30° C. to measure the flow time of 10 ml of a polymer solution (0.15 g of polymer in 100 ml of ethyl acetate or tetrahydrofuran). Both polymer solutions and controls were run under identical conditions.

PSA Test Methods

Tape samples were prepared by extrusion-coating onto primed, 35 micrometer polyester film using a 19 mm Haake ® extruder equipped with a draw die (101 mm × 50 micrometers) and a Rheocord ® rheometer.

The standard tests are described in detail in various publications of the American Society for Testing and Materials (ASTM), Philadelphia, Pa. and the Pressure Sensitive Tape Council (PSTC), Glenview, Ill. The standard test methods are described in detail below. The reference source of each of the standard test methods is also given.

SHEAR STRENGTH

Reference ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

PEEL ADHESION (Reference: ASTM D3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself so the angle of removal will be 180°. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the range of numbers observed during the test.

While this invention has been described in connection with specific embodiments, it should be understood that it is capable of further modification. For example the disclosed solution polymerization method of making the polymeric materials comprising the hot melt pressure sensitive adhesive compositions of the present invention may be substituted by other conventional polymeric processes such as suspension, emulsion or bulk polymerization techniques. It should be understood that certain modifications may be required in such techniques to facilitate or optimize their use to produce the claimed hot melt pressure sensitive adhesive compositions. The claims herein are intended to cover those variations which one skilled in the art would recognize as the chemical equivalent of what has been described here.

I claim:

1. A hot melt pressure sensitive adhesive composition comprising copolymer consisting essentially of copolymerized monomers a, b, and c, as follows:
    (a) about 82-92% by weight of acrylic or methacrylic acid ester of a non-tertiary alcohol, said alcohol having from 1 to 14 carbon atoms with the average number of carbon atoms being about 4-12;
    (b) about 2-5% by weight polar monomer copolymerizable with said monomeric acrylic or methacrylic acid ester; and
    (c) about 2-15% by weight of 2-polystyrylethyl methacrylate macromolecular monomer; and
sufficient zinc carboxylate to endow the composition with improved melt flow properties and cohesive strength.

2. The adhesive composition of claim 1 wherein said zinc carboxylate is selected from the group consisting of zinc acetate, zinc octoate, and zinc neodecanoate.

3. The adhesive composition of claim 1 wherein said monomeric acrylic or methacrylic acid ester is selected from the group consisting of butylacrylate, isooctyl acrylate, 2-ethylhexyl acrylate, and isononyl acrylate.

4. The adhesive composition of claim 1 wherein said polar monomer is selected from the group consisting of acrylic acid, methacrylic acid, itaconic acid, maleic anhydride, maleic acid, citraconic anhydride, citraconic acid and mixtures thereof.

5. The adhesive composition of claim 1 wherein the amount of zinc carboxylate is from about 0.1 to 5% by weight based on the weight of said copolymer.

6. The adhesive composition of claim 1 further including sufficient tackifier resin to endow said composition with improved adhesive tack.

7. An adhesive coated sheet material comprising a backing sheet coated on at least a portion of one major surface with a hot melt pressure sensitive adhesive composition comprising copolymer consisting essentially of copolymerized monomers a, b, and c, as follows:
    (a) about 82-92% by weight of acrylic or methacrylic acid ester of a non-tertiary alcohol, said alcohol having from 1 to 14 carbon atoms with the average number of carbon atoms being about 4-12;
    (b) about 2-5% by weight polar monomer copolymerizable with said monomeric acrylic or methacrylic acid ester; and
    (c) about 2-15% by weight of 2-polystyrylethyl methacrylate macromolecular monomer; and sufficient zinc carboxylate to endow the composition with improved melt flow properties and cohesive strength.

8. The adhesive coated sheet material of claim 7 wherein said zinc carboxylate is selected from the group consisting of zinc acetate, zinc octoate, and zinc neodecanoate.

9. The adhesive coated sheet material of claim 7 wherein said monomeric acrylic or methacrylic acid ester is selected from the group consisting of butylacrylate, isooctyl acrylate, 2-ethylhexyl acrylate, and isononyl acrylate.

10. The adhesive coated sheet material of claim 7 wherein said polar monomer is selected from the group consisting of acrylic acid, methacrylic acid, itaconic acid, maleic anhydride, maleic acid, citraconic anhydride, citraconic acid and mixtures thereof.

11. The adhesive coated sheet material of claim 7 wherein the amount of zinc carboxylate is from about 0.1 to 5% by weight based on the weight of said copolymer.

12. The adhesive coated sheet material of claim 7 further including sufficient tackifier resin to endow said adhesive composition with improved adhesive tack.

* * * * *

UNITED STATES PATENT AND TRADEMARK OFFICE
CERTIFICATE OF CORRECTION

PATENT NO.  : 4,851,278

DATED       : JULY 25, 1989

INVENTOR(S) : RUDYARD M. ENANOZA

It is certified that error appears in the above-identified patent and that said Letters Patent is hereby corrected as shown below:

Col. 1, line 63, After "of" insert --low--.

Col. 2, line 41, "Hot Melt Adhesives," should be --<u>Hot Melt Adhesives</u>,--.

Col. 4, line 57, "Plus" should be --Plus.-- .

Col. 4, line 63, After "methyl" insert --ethyl--.

Col. 5, line 59-60, "polystyylethyl" should be --polystyrylethyl--

Col. 6, line 8, After "transferred to a" add --TEFLON$^{TM}$-lined--.

Col. 6, line 35, "iso-octyl" should be --isooctyl--.

Col. 6, line 40, "5°C." should be --55°C.--.

Col. 6, line 45, "TEFLONTM T-lined" should be --TEFLON$^{TM}$-lined--.

UNITED STATES PATENT AND TRADEMARK OFFICE
CERTIFICATE OF CORRECTION

PATENT NO. : 4,851,278
DATED : JULY 25, 1989
INVENTOR(S) : RUDYARD M. ENANOZA

It is certified that error appears in the above-identified patent and that said Letters Patent is hereby corrected as shown below:

Col. 7, line 27-28, "macro-molecular" should be --macromolecular--.

Col. 7, line 30, "in situ," should be --$\underline{in\ situ}$,--.

Col. 8, line 38, "2.58 X 105" should be --$2.58 \times 10^5$--.

Signed and Sealed this

Eighteenth Day of June, 1991

Attest:

HARRY F. MANBECK, JR.

Attesting Officer

Commissioner of Patents and Trademarks